(12) United States Patent
Lin (10) Patent No.: US 9,235,534 B2
(45) Date of Patent: Jan. 12, 2016

(54) DATA PROTECTING METHOD, MEMORY CONTROLLER AND MEMORY STORAGE APPARATUS

(75) Inventor: Chin-Min Lin, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 508 days.

(21) Appl. No.: 13/472,488

(22) Filed: May 16, 2012

(65) Prior Publication Data

US 2013/0185479 A1 Jul. 18, 2013

(30) Foreign Application Priority Data

Jan. 13, 2012 (TW) .............................. 101101461 A (51) Int. Cl.
*G06F 12/00* (2006.01)
*G06F 12/14* (2006.01)

(52) U.S. Cl.
CPC .................................... *G06F 12/145* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0233381 | A1* | 12/2003 | Sugimura et al. | 707/200 |
| 2004/0111582 | A1* | 6/2004 | Maeda et al. | 711/202 |
| 2004/0186971 | A1* | 9/2004 | Meharchand et al. | 711/163 |
| 2007/0180535 | A1* | 8/2007 | Seo et al. | 726/27 |
| 2007/0271472 | A1* | 11/2007 | Grynberg | 713/193 |
| 2010/0318721 | A1* | 12/2010 | Avila et al. | 711/103 |
| 2011/0107393 | A1* | 5/2011 | Sela et al. | 726/1 |
| 2013/0013846 | A1* | 1/2013 | Lo | 711/102 |
| 2013/0179626 | A1* | 7/2013 | Chang et al. | 711/103 |

FOREIGN PATENT DOCUMENTS

| | | |
|---|---|---|
| CN | 101901227 | 12/2010 |
| TW | 201133236 | 10/2011 |

OTHER PUBLICATIONS

"Office Action of China Counterpart Application", issued on Jun. 3, 2015, p. 1-p. 9, in which the listed references were cited.

* cited by examiner

*Primary Examiner* — Gurtej Bansal
(74) *Attorney, Agent, or Firm* — Jianq Chyun IP Office (57) ABSTRACT

A data protecting method for protecting a sub-directory and at least one pre-stored file in a rewritable non-volatile memory module is provided. The method includes receiving a write command from a host system and determining whether a write address indicated by the write command is an address storing a file description block of the sub-directory. The method also includes, when the write address is the address storing a file description block of the sub-directory, determining whether a portion of data streams corresponding to the write command is the same as a corresponding content recorded in the file description block of the sub-directory. The method further includes, when the portion of data streams corresponding to the write command is not the same as the corresponding content recorded in the file description block of the sub-directory, transmitting a write failure signal to the host system.

21 Claims, 8 Drawing Sheets

| | Zeroth entry value | 1st entry value | 2nd entry value | 3rd entry value | 4th entry value | 5th entry value | 6th entry value | 7th entry value | | 127th entry value |
|---|---|---|---|---|---|---|---|---|---|---|
| 700(M) | F8hFFhFFh0Fh | FFhFFhFFh0Fh | FFFFFFh | 0000000h | 0000000h | 0000000h | 0000000h | 0000000h | ...... | 0000000h |
| 700(M+1) | ...... | | | | | | | | | |
| 700(M+K) | ...... | | | | | | | | | |

DATA PROTECTING METHOD, MEMORY CONTROLLER AND MEMORY STORAGE APPARATUS

CROSS-REFERENCE TO RELATED APPLICATION

This application claims the priority benefit of Taiwan application serial no. 101101461, filed on Jan. 13, 2012. The entirety of the above-mentioned patent application is hereby incorporated by reference herein and made a part of this specification.

BACKGROUND

1. Technology Field

The present invention is related to a data protecting method for data in a rewritable non-volatile memory module, and a memory controller and a memory storage apparatus using the same.

2. Description of Related Art

The rapid growth in the popularity of digital cameras, cellular phones, and MP3 players in recent years has brought about the escalated demand for storage media by consumers. Since a rewritable non-volatile memory (e.g., a flash memory) has several characteristics such as non-volatility of data, low power consumption, small size and non-mechanical structure, the rewritable non-volatile memory is the most suitable memory to be adopted in a portable multimedia device mentioned above.

Moreover, to increase the additional value of the memory storage apparatus, some specific files for specific application which can be accessed by the user or the corresponding application program may be stored in the memory storage apparatus in advance by the manufacturer while producing the memory storage apparatus.

For example, a program provided to an user for setting or removing the protecting password is stored in the memory storage apparatus initially. Another example is that, within the application of the Smart Card chip disposed in the memory storage apparatus, a communication file used for determining whether the data streams transmitted by the host is the command data unit of the Smart Card chip is pre-stored in the memory storage apparatus.

Therefore, the pre-stored files are very important to the usage of the memory storage apparatus. If the files are deleted by the user accidentally, the corresponding functions provided by the memory storage apparatus are unavailable, and the memory storage apparatus may not be used anymore. Thus, how to protect the pre-stored files is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data protecting method, a memory controller and a memory storage apparatus for effectively protecting the pre-set sub-directory and pre-stored files from accidental deleting.

According to an exemplary embodiment of the present invention, a data protecting method for protecting the sub-directory and at least one pre-stored file therein in a rewritable non-volatile memory module is provided, wherein the rewritable non-volatile memory module includes a plurality of physical blocks and a plurality of logical block addresses are configured to map to a portion of the physical blocks, and these logical block addresses are formatted to be a partition having a file allocation table area, a root directory area and a file area. The present data protecting method includes receiving a write command from the host system, wherein the write command indicates a write address. The present data protecting method also includes determining whether the write address is the address storing a file description block of the sub-directory. The present data protecting method still includes determining whether a portion of data streams corresponding to the write command is the same as a corresponding content recorded in the file description block of the sub-directory if the write address is the address storing the file description block of the sub-directory. The data protecting method further includes transmitting a write failure signal to the host system if the portion of the data streams corresponding to the write command is not the same as the corresponding content in the file description block of the sub-directory.

According to an exemplary embodiment of the present invention, a data protecting method for protecting the sub-directory and the at least one pre-stored file therein in a rewritable non-volatile memory module is provided, wherein the rewritable non-volatile memory module includes a plurality of physical blocks and a plurality of logical block addresses are configured to map to a portion of the physical blocks, and these logical block addresses are formatted to be a partition having a file allocation table area, a root directory area and a file area. The present data protecting method includes receiving a write command from a host system, wherein the write command indicates a write address. The present data protecting method also includes determining whether the write address is an address storing the file description block of the pre-stored file. The present data protecting method still includes determining whether a portion of data streams corresponding to the write command is the same as a corresponding content recorded in the file description block of the pre-stored file if the write address is the address storing a file description block of the pre-stored file. The present data protecting method further includes transmitting a write failure signal to the host system when the portion of the data streams corresponding to the write command is not the same as the corresponding content in the file description block of the pre-stored file.

According to another exemplary embodiment of the present invention, a memory controller for controlling the rewritable non-volatile memory module having a plurality of physical blocks is provided. The present memory controller includes a host interface, a memory interface and a memory management circuit. The host interface is coupled to a host system. The memory interface is coupled to the rewritable non-volatile memory module. The memory management circuit is coupled to the host interface and the memory interface, and configures a plurality of logical block addresses for mapping to a portion of physical blocks, wherein the logical block addresses are formatted to be a partition which contains a file allocation table area, a root directory area and a file area. The root directory area stores a file description block corresponding to a sub-directory. The present memory management circuit receives a write command from the host system, wherein the write command indicates a write address. Moreover, the memory management circuit determines whether the write address is an address storing the file description block of the sub-directory. When the write address is the address storing the file description block of the sub-directory, the memory management circuit determines whether a portion of data streams corresponding to the write command is the same as a corresponding content recorded in the file description block of the sub-directory. When the portion of the data streams corresponding to the write command is not the same as the corresponding content recorded in the file description block of the sub-directory, the memory management circuit transmits a write failure signal to the host system.

According to another exemplary embodiment of the present invention, a memory controller for controlling the rewritable non-volatile memory module having a plurality of physical blocks is provided. The present memory controller includes a host interface, a memory interface and a memory management circuit. The host interface is coupled to a host system. The memory interface is coupled to the rewritable non-volatile memory module. The memory management circuit is coupled to the host interface and the memory interface, and configures a plurality of logical block addresses for mapping to a portion of physical blocks, wherein the logical block addresses are formatted to be the partition which contains a file allocation table area, a root directory area and a file area. The root directory area stores the file description block corresponding to a sub-directory, and a cluster recorded in the file description block of the sub-directory store at least one file description block corresponding to at least one pre-stored file. The present memory management circuit receives a write command from the host system, wherein the write command indicates a write address. Moreover, the memory management circuit determines whether the write address is the address storing the at least one file description block of the at least one pre-stored file. When the write address is an address storing the at least one file description block of the at least one pre-stored file, the memory management circuit determines whether a portion of data streams corresponding to the write command is the same as a corresponding content recorded in the at least one file description block of the at least one pre-stored file. When the portion of the data streams corresponding to the write command is not the same as the corresponding content recorded in the at least one file description block of the at least one pre-stored file, the memory management circuit transmits a write failure signal to the host system.

According to another exemplary embodiment of the present invention, a memory storage apparatus which includes a connector, a rewritable non-volatile memory module and a memory controller is provided. The connector is coupled to a host system. The rewritable non-volatile memory module includes a plurality of physical blocks. The memory controller is coupled to the connector and the rewritable non-volatile memory module, and configures a plurality of logical block addresses for mapping to a portion of physical blocks, wherein the logical block addresses are formatted to be a partition which contains a file allocation table area, a root directory area and a file area. The root directory area stores a file description block corresponding to a sub-directory. The present memory controller receives a write command from the host system, wherein the write command indicates a write address. Moreover, the memory controller determines whether the write address is an address storing the file description block of the sub-directory. When the write address is the address storing the file description block of the sub-directory, the memory controller determines whether a portion of data streams corresponding to the write command is the same as a corresponding content recorded in the file description block of the sub-directory. When portion of the data streams corresponding to the write command is not the same as the corresponding content recorded in the file description block of the sub-directory, the memory controller transmits a write failure signal to the host system.

According to another exemplary embodiment of the present invention, a memory storage apparatus which includes a connector, a rewritable non-volatile memory module and a memory controller is provided. The connector is coupled to a host system. The rewritable non-volatile memory module includes a plurality of physical blocks. The memory controller is coupled to the connector and the rewritable non-volatile memory module, and configures a plurality of logical block addresses for mapping to a portion of physical blocks, wherein the logical block addresses are formatted to be a partition which contains the file allocation table area, the root directory area and the file area. The root directory area stores the file description block corresponding to a sub-directory, and a cluster recorded in the file description block of the sub-directory stores at least one file description block corresponding to at least one pre-stored file. The present memory controller receives a write command from the host system, wherein the write command indicates a write address. Moreover, the memory controller determines whether the write address is an address storing the at least one file description block of the at least one pre-stored file. When the write address is the address storing the file description block of the pre-stored file, the memory controller determines whether a portion of data streams corresponding to the write command is the same as a corresponding content recorded in the at least one file description block of the at least one pre-stored file. When the portion of the data streams corresponding to the write command is not the same as the corresponding content recorded in the at least one file description block of the at least one pre-stored file, the memory controller transmits a write failure signal to the host system.

In summary, the data protecting method, the memory controller and the memory storage apparatus mentioned in the above exemplary embodiments can effectively prevent the directory and the file stored in the rewritable non-volatile memory module from accidental deleting or amending.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned features and advantages of the present invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1:
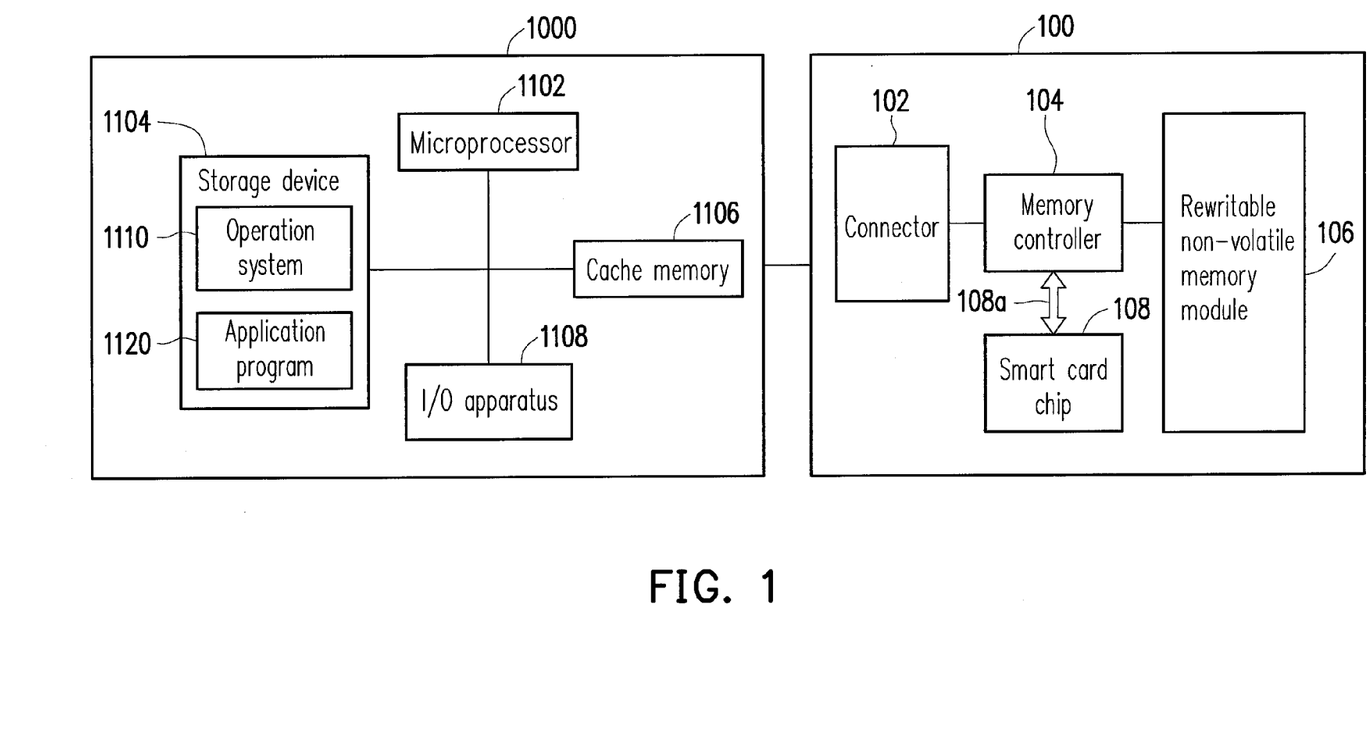
FIG. 1 is a schematic block diagram illustrating a host system and a memory storage apparatus according to an exemplary embodiment of the present invention.

FIG. 1 is a schematic block diagram illustrating a host system and a memory storage apparatus according to an exemplary embodiment of the present invention.

Referring to FIG. 1, the host system 1000 includes a microprocessor 1102, a storage device 1104, a cache memory 1106 and an I/O apparatus 1108. When the host system 1000 begins its operation, the microprocessor 1102 may execute the operation system installed in the storage device in order to provide corresponding functions to the user according to the user's command. For example, if the host system 1000 is a cell phone system and the operation system 1110 may be Symbian, Android or other operation systems, the user may control the host system 1000 to execute the functions such as communication or audio/video playing through the I/O apparatus 1108 after starting up the host system 1000. Even though the host system 1000 is described as a cell phone system in the present exemplary embodiment, in another exemplary embodiment of the present invention, the host system 1000 may be a computer, a digital camera, a video camera, an audio player or a video player.

A memory storage apparatus 100 is coupled to the host system 1000 and executes the data writing or reading according to the command from the operation system 1110 of the host system 1000. For example, in a case where the host system 1000 is the cell phone system, the memory storage apparatus 100 may be a Secure Digital (SD) Card, a Multi Media Card (MMC), a memory stick, a Compact Flash (CF) card or an embedded storage device. The embedded storage device includes a Embedded Multi Media Card (eMMC). It should be noted that the eMMC is directly coupled to a substrate of the host system.

The memory storage apparatus 100 includes a connector 102, a memory controller 104 and a rewritable non-volatile memory module 106.

The connector 102 is compatible with a SD standard. However, the present invention is not limited thereto, and the connector 102 may also be compatible with a Memory Stick (MS) standard, a Multi Media Card (MMC) standard, a Compact Flash (CF) standard, an Institute of Electrical and Electronic Engineers (IEEE) 1394 standard, a Peripheral Component Interconnect Express (PCI Express) standard, a Serial Advanced Technology Attachment (SATA) standard, a Parallel Advanced Technology Attachment (PATA) standard, a Universal Serial Bus (USB) standard, an Integrated Device Electronics (IDE) standard, or other suitable standard.

The memory controller 104 is configured for executing a plurality of logic gates or control commands which are implemented in a hardware form or in a firmware form and performing the operations such as data writing, reading or erasing in the rewritable non-volatile memory module 106 according to the command of the host system 1000. Especially, the memory controller 104 can execute the data protecting method shown in the present exemplary embodiment to protect the pre-set sub-directory and the pre-stored file therein.

The rewritable non-volatile memory module 106 is coupled to the memory controller 104 and is configured to store the data written by the host system 1000. The rewritable non-volatile memory module 106 includes a plurality of physical blocks. Each of the physical blocks includes a plurality of physical pages, wherein the physical pages which belong to the same physical block can be written individually and have to be erased simultaneously. In detail, each of the physical blocks is the smallest unit for erasing data. Namely, each of the physical blocks contains the least number of memory cells that are erased all together. Each of physical pages is the smallest unit for programming data. That is to say, each of the physical pages is the smallest unit for updating data. However, it should be understood that in another exemplary embodiment, the smallest unit for updating data may be one sector or other size. In the present exemplary embodiment, the rewritable non-volatile memory module 106 is a Multi Level Cell (MLC) NAND flash memory module. However, the present invention is not limited thereto. The rewritable non-volatile memory module 106 may also be a Single Level Cell (SLC) NAND flash memory module, other flash memory modules or other memory modules with the same property.

Figure 2:
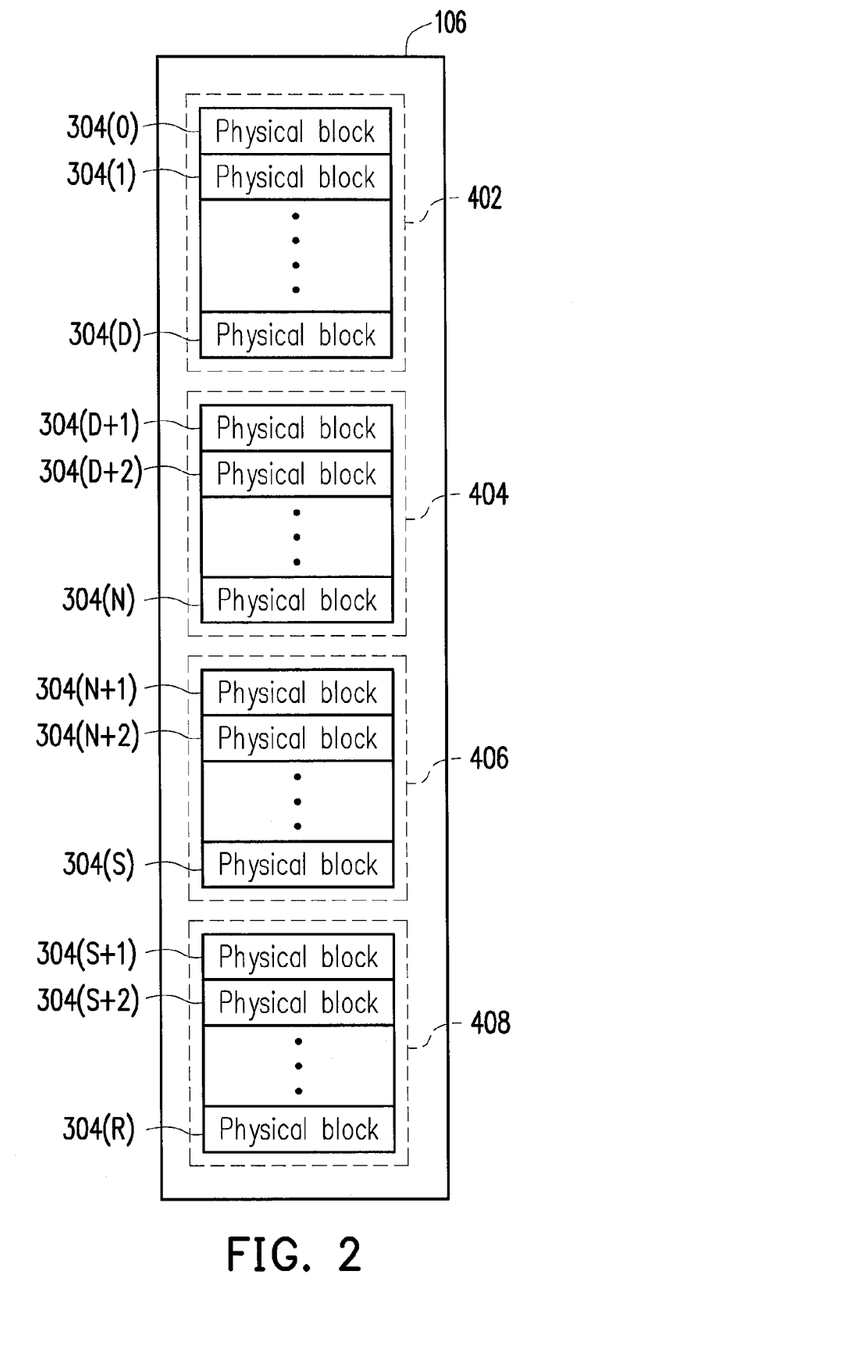
FIG. 2 and FIG. 3 are schematic diagrams illustrating the management of the physical blocks.
Figure 3:
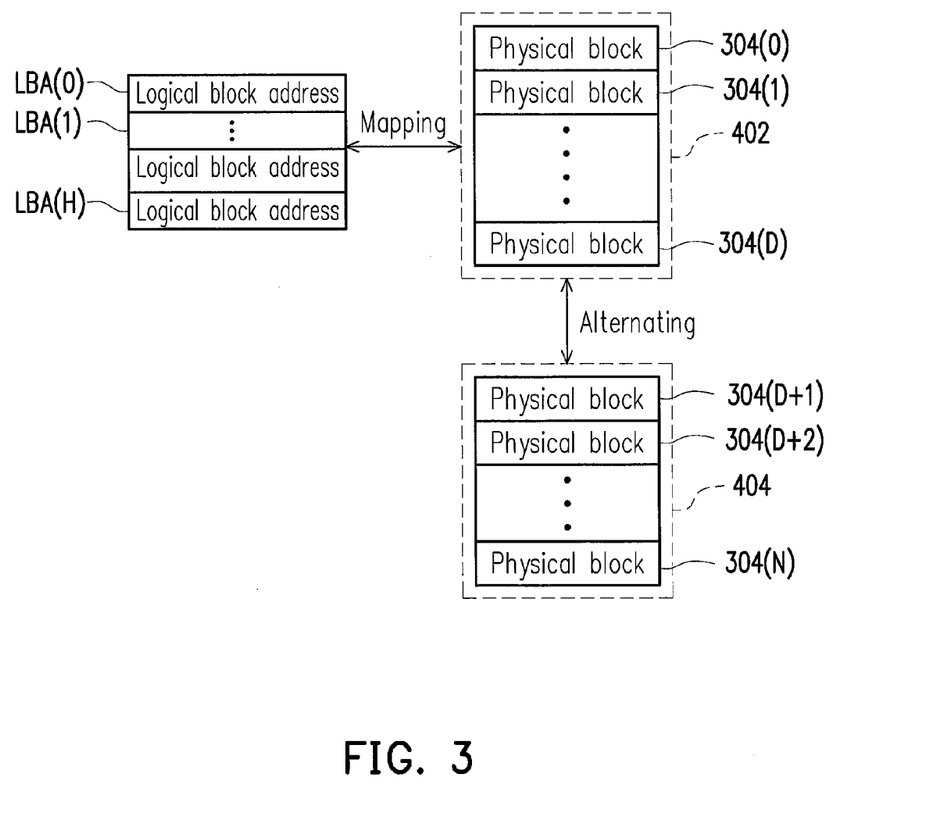

FIG. 2 and FIG. 3 are schematic diagrams illustrating the management of the physical blocks.

Referring to the FIG. 2, in the present exemplary embodiment, the memory controller 104 logically divides the physical blocks 304(0)~304(R) of the rewritable non-volatile memory module 106 into a data area 402, a spare area 404, a system area 406 and a replacement area 408, wherein the physical blocks assigned to be the data area 402 and the spare area 404 alternately store the data written by the host system 1000. The physical blocks of the system area 406 are used for storing the system data of the memory storage apparatus 100, and the physical blocks of the replacement area 408 are used for replacing the damaged physical blocks in the data area and the spare area.

Referring to FIG. 3, in order to allow the host system 1000 to conveniently access the physical blocks which store data in an alternate manner, the memory controller 104 configures the logical block addresses LBA(0)~LBA(H) for mapping to the physical blocks in the data area 402, so that the host system 1000 can process the data writing and reading directly according to the logical block addresses.

Figure 4:
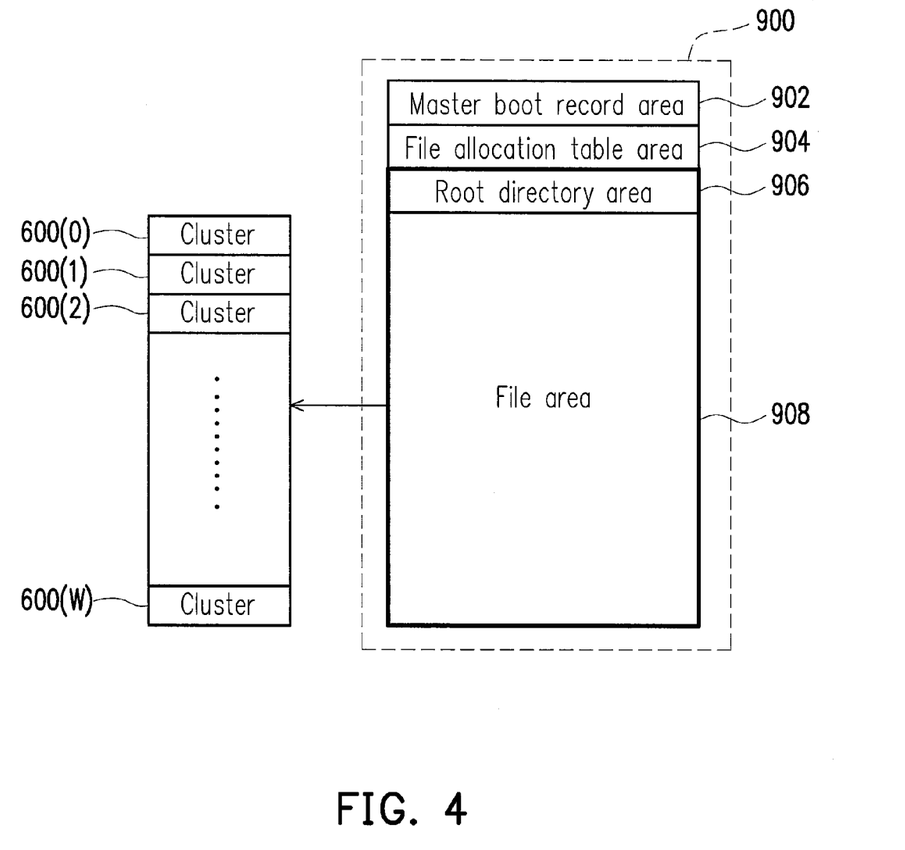
FIG. 4 is an example illustrating the logical bock addresses of the memory module formatted by the file system according to an exemplary embodiment.

In the present exemplary embodiment, the logical block addresses LBA(0)~LBA(H) are formatted to be a partition 900 (as shown in FIG. 4) according to the file system, wherein the partition includes a master boot record area 902, a file allocation table area 904, a root directory area 906, and a file area 908.

The logical block addresses which belong to the master boot record area 902 are configured to store the system information of the available storage space in the memory storage apparatus 100.

The logical block addresses which belong to the file allocation table area 904 are configured to store the file allocation table. The file allocation table is used for recording the entry values of the logical block addresses which are employed for storing data. For example, two file allocation tables are stored in the file allocation table area, wherein one file allocation table is configured for normal access, another file allocation table is configured for backup.

The logical block addresses of the root directory area 906 is used for storing the file description blocks (FDB) which are configured for recording the properties of files and directories stored in the memory storage apparatus 100. For example, a file description block corresponding to a file records the file name and the initial logical block address (i.e. initial cluster) of the file, and a file description block corresponding to a directory records the directory name, the file stored in the directory and the logical block address of the file description block disposed in the directory.

The logical block addresses which belong to the file area 908 are divided into a plurality of clusters and used for actually storing the content of the files.

To be specific, in a disk, the smallest storage unit is one sector and each sector can store 512 bytes of data. However, when storing data in units of each sector, the performance of the host system 1000 would be not well. In general, the operating system 1110 of the host system 1000 would not take each sector as a unit of accessing data, but takes each cluster as a basic file unit. Each cluster is constructed with $2^n$ sectors. For example, if one cluster is constructed of 8 continuous sectors, then the size of the cluster is 4096 bytes. Accordingly, the operation system 1110 writes or reads data with 8 continuous sectors to enhance the efficiency of accessing data. However, the size of one cluster is not the larger the better. Because one cluster is the larger, the wasted storage spaces will be more. For example, when the size of one cluster is 4 kilobytes (KB) and the size of a file stored by the host system 1000 just is 1 KB, the file still occupies one cluster and other storage spaces of the cluster would be wasted. In particular, the total of clusters configured in the portable memory storage apparatus 100 is limited based on the capacity of the rewritable non-volatile memory module 106 and the type of FAT. Taking FAT 16 as an example, the maximum number of clusters must be within 4048~65526 according to the design of FAT16. Therefore, when a memory storage apparatus having 128 megabytes (MB) of storage spaces is formatted by FAT 16, each cluster must be constructed with at least 4 sectors, otherwise the number of clusters in the memory storage apparatus will exceed 65526 (i.e., 127901/512/4=62452). So, the size of each cluster is 2KB. Similarly, according to the design of FAT 32, the maximum number of clusters must be within 65526~4177918. It should be noted that according to the design of FAT 16, the size of the root directory area 906 is fixed. But, according to the design of FAT 32, the root directory area 906 is configured in the file area 908 for managing together.

Figure 5:
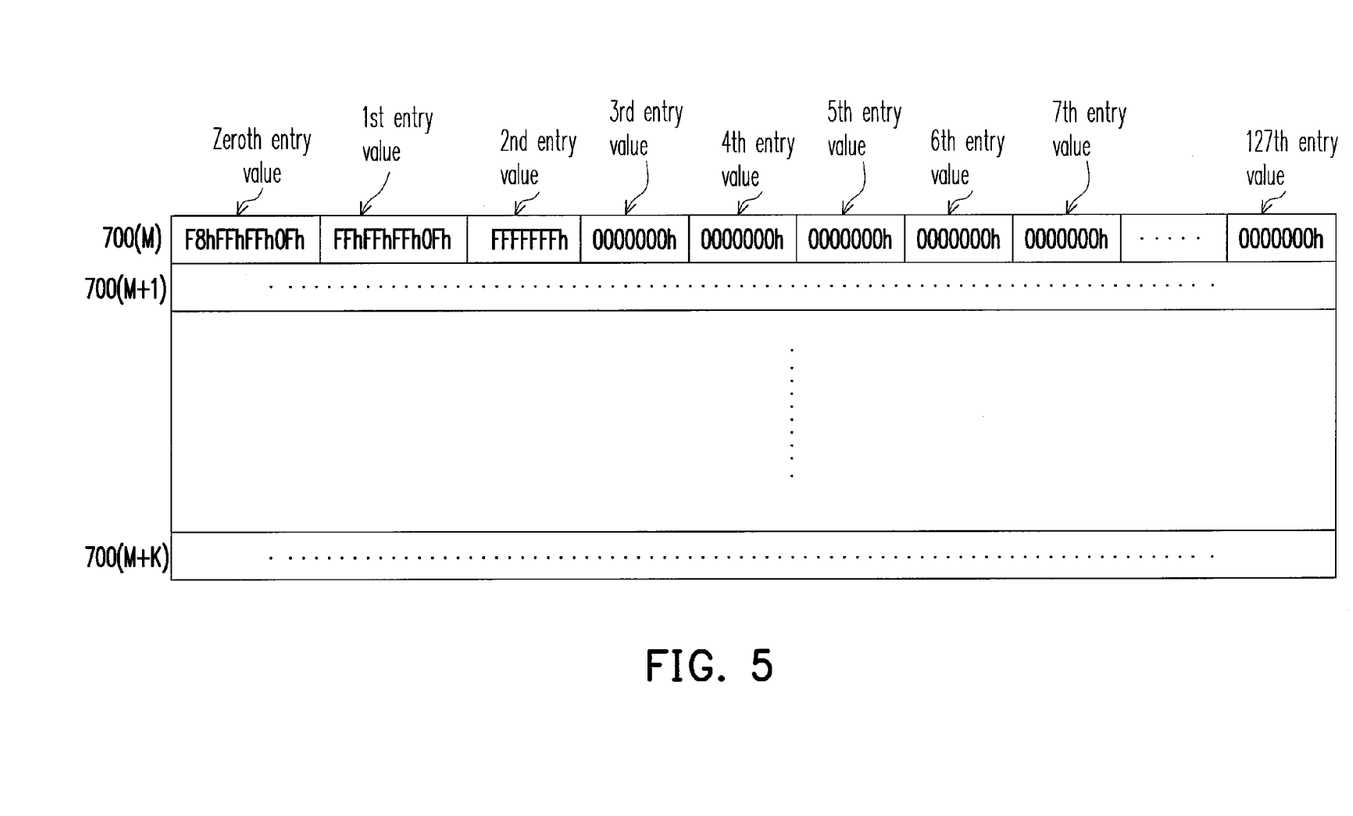
FIG. 5 is an example illustrating the file allocation table area according to an exemplary embodiment.

For example, in the present exemplary embodiment, the partition 900 is a partition complied with the standards of FAT 32. Therefore, the sectors belonging to the root directory area 906 and the file area 908 are grouped into clusters 600(0)~600(W). Herein, it is assumed that the cluster 600(0) is configured as a start cluster of the root directory area 906. Moreover, the file allocation table area 904 includes the sectors 700(M)~700(M+K) (As shown in the FIG. 5) for recording the entry values corresponding to the clusters 600(0)~600(W). Herein, the entry values are used for indicating the status of the corresponding clusters. For example, according the design of FAT32, "0000000h" represents the cluster as an idle logical block address (i.e. no data stored therein), "FFFFFF7h" represents the clusters as a damaged logical block address (i.e. unavailable for storing data) and "FFFFFF8h"-"FFFFFFFh" represents the cluster as the last logical block address for storing data. Herein, the first two entry values of the sector 700(M) are saved and recorded as "F8hFFhFFh0Fh" and "FFhFFhFFh0Fh"; the second entry value is corresponding to the cluster 600(0) of the root directory area 906; the third entry value is corresponding to the cluster 600(1). The fourth entry value is corresponding to the cluster 600(2); the fifth entry value is corresponding to the cluster 600(3); the sixth entry value is corresponding to the cluster 600(4); the seventh entry value is corresponding to the cluster 600(5) and so on. Therefore, the entry values corresponding to the clusters 600(0)~600(W) are recorded in the sectors of the file allocation table area 904.

Referring to the FIG. 1 again, in the present exemplary embodiment, the memory storage apparatus 100 further includes a smart card chip 108. The smart card chip 108 is coupled to the memory controller 104 through the interface 108a, wherein the interface 108a is utilized for communicating with the Smart Card chip 108.

The smart card chip 108 has a microprocessor, a security module, a read only memory (ROM), a random access memory (RAM), an electrically erasable programmable read-only memory (EEPROM), and an oscillator, etc. The microprocessor controls the overall operation of the smart card chip 108. The security module encrypts/decrypts data stored in the smart card chip 108. The oscillator generates a clock signal required by the operation of the smart card chip 108. The RAM temporarily stores operation data or firmware programs. The EEPROM stores user data. The ROM stores firmware programs of the smart card chip 108. To be specific, when the smart card chip 108 is in operation, the microprocessor of the smart card chip 108 executes the firmware programs in the ROM to execute related operations.

In particular, the security module of the smart card chip 108 executes a security mechanism to prevent any attack to data stored in the smart card chip 108. Herein the attack may be timing attack, single-power-analysis attack, or differential-power-analysis attack. Besides, the security mechanism executed by the smart card chip 108 complies with the third or higher level of the Federal Information Processing Standards (FIPS) 140-2 or the third or higher level of EMV EL. Namely, the smart card chip 108 passes an authentication of the fourth or higher level of FIPS 140-2 or an authentication of the fourth or higher level of EMV EL. Herein FIPS are publicly announced standards developed by the United States federal government for use by all non-military government agencies and by government contractors, and FIPS 140-2 specifics different levels of data security. In addition, EMV is a global standard for financial transactions and authentications of smart cards, integrated circuit (IC) card capable point of sale (POS) terminals, and automated teller machines (ATMs). The EMV standards define the interaction at the physical, electrical, data and application levels between IC credit and debit cards payment systems. In the present exemplary embodiment, the memory storage apparatus 100 offers services with identify-based authentication (for example, a micro payment service and a ticket service) through the operation of the smart card chip 108.

Figure 6:
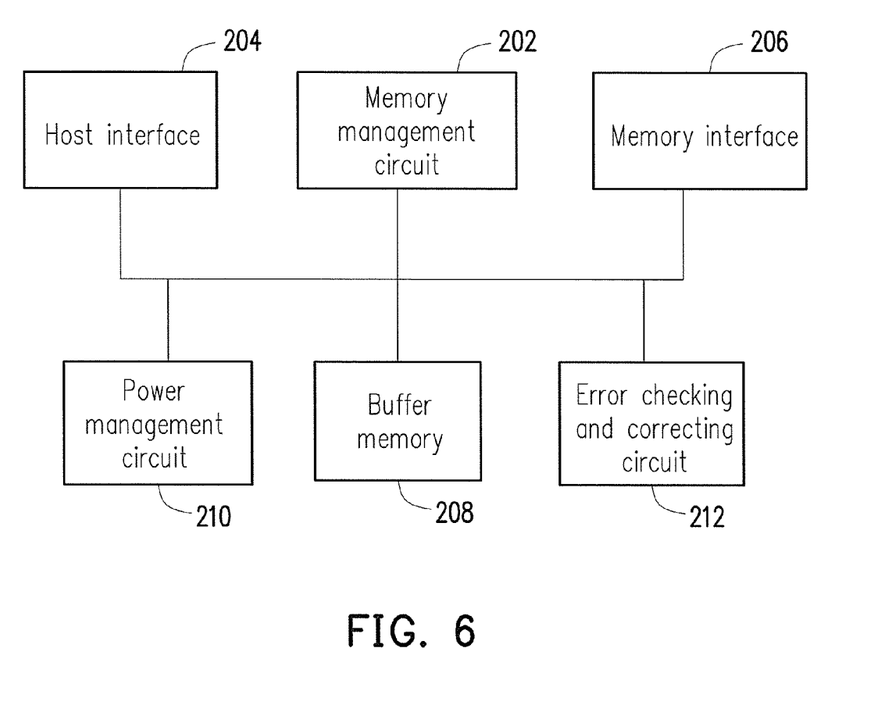
FIG. 6 is a schematic block diagram illustrating the memory controller according to the present exemplary embodiment.

FIG. 6 is a schematic block diagram illustrating a memory controller according to an exemplary embodiment.

Referring to the FIG. 6, the memory controller 104 includes a memory management circuit 202, a host interface 204, a memory interface 206, a buffer memory 208, a power management circuit 210 and an error checking and correcting circuit 212.

The memory management circuit 202 is configured to control the whole operation of the memory controller 104. To be more specific, the memory management circuit 202 includes a plurality of the control commands which are executed for controlling the whole operation of the memory controller 104 while the memory storage apparatus 100 is power on.

In the present exemplary embodiment, the control instructions of the memory management circuit 202 are implemented in a firmware form. For example, the memory management circuit 202 includes a microprocessor unit (not shown) and a read-only memory (ROM, not shown), where the control instructions are recorded in the read-only memory. When the memory storage apparatus 100 is operated, the control instructions are executed by the microprocessor unit.

In another exemplary embodiment of the present invention, the control commands of the memory management circuit 202 may also be stored in a specific area (for example, a system area in a memory module exclusively used for storing system data) of the rewritable non-volatile memory module 106 as a programming code. Moreover, the memory management circuit 202 includes a microprocessor unit (not shown), a read-only memory (ROM, not shown) and a random access memory (not shown). Especially, the read-only memory includes boot codes which are executed by the microprocessor unit firstly for downloading the control instructions stored in the rewritable non-volatile memory module 106 into the random access memory of the memory management circuit 202 when the memory controller 104 is activated. Afterwards, the microprocessor unit employs the control instructions.

Furthermore, as in another exemplary embodiment, the control instructions in the memory management circuit 202 are implemented in a hardware form. For example, the memory management circuit 202 includes a microprocessor, a memory managing unit, a memory writing unit, a memory reading unit, a memory erasing unit and a data processing unit. The memory managing unit, the memory writing unit, the memory reading unit, the memory erasing unit and the data processing unit are coupled to the micro control unit. Wherein, the memory managing unit is configured for managing the physical blocks of the rewritable non-volatile memory module 106, the memory writing unit is configured for transmitting the write command to the rewritable non-volatile memory module 106 in order to write data to the rewritable non-volatile memory module 106, the memory reading unit is configured for transmitting the read command to the rewritable non-volatile memory module 106 in order to read data from the rewritable non-volatile memory module 106, the memory erasing unit is configured for transmitting the erase command to the rewritable non-volatile memory module 106 in order to erase data in the rewritable non-volatile memory module 106, and the data processing unit is configured for processing data to be written into the rewritable non-volatile memory module 106 or data read from the rewritable non-volatile memory module 106.

The host interface 204 is coupled to the memory management circuit 202 and configured to receive and identify the commands and data transmitted by the host system 1000. Namely, the commands and data transmitted by the host system 1000 are passed to the memory management circuit 202 through the host interface 204. In the present exemplary embodiment, the host interface 204 complies with the SD standard. However, the present invention is not limited thereto, and the host interface 204 may also comply with a MS standard, a MMC standard, a CF standard, a PATA standard, IEEE 1394 standard, a PCI Express standard, an USB standard, an IDE standard, or other suitable standards.

The memory interface 206 is coupled to the memory management circuit 202 for accessing the rewritable non-volatile memory module 106. In other words, data to be written to the rewritable non-volatile memory module 106 is converted to an acceptable format for the rewritable non-volatile memory module 106 by the memory interface 206.

The buffer memory 208 is coupled to the memory management circuit 202 and configured to temporarily store data and commands from the host system 1000 or data from the rewritable non-volatile memory module 106.

The power management circuit 210 is coupled to the memory management circuit 202 and configured to control the power of the memory storage apparatus 100.

The error checking and correcting circuit 212 is coupled to the memory management circuit 202 and configured to perform an error checking and correcting procedure to assure the accuracy of data. To be more specific, when the memory managing 202 receives the write command from the host system 1000, the error checking and correcting circuit 212 generates an error checking and correcting code (ECC code) corresponding to the data of the write command, and the memory management circuit 202 writes the data corresponding to the write command and the corresponding ECC code into the rewritable non-volatile memory module 106. Afterwards, when the memory management circuit 202 reads the data from the rewritable non-volatile memory module 106, the corresponding ECC code is also be read, and the error checking and correcting circuit 212 executes the error checking and correcting procedure to the read data according to the ECC code.

It should be noted that the smart card chip 108 receives the commands and the data from the host system 1000 and transmits the data to the host system 1000 through the connector 102 of the memory storage apparatus 100 rather than communicates with the host system 1000 through the smart card interface (i.e. interface 108a). Based on the above description, an application program 1120 is installed in the host system 1000 and employs a specific communication file for transmitting a command data unit, such as Command-Application Protocol Data Unit (C-APDU), to the smart card chip 108 and receiving a response data unit, such as Response-Application Protocol Data Unit (R-APDU), of the smart card chip 108.

To be more specific, in the present exemplary embodiment, the application program 1120 creates a pre-set sub-directory (folder) for pre-storing one or more files (hereinafter called "pre-stored file") and transmits the information of the logical block addresses adopted for storing one or more pre-stored files to the memory controller 104.

Figure 7:
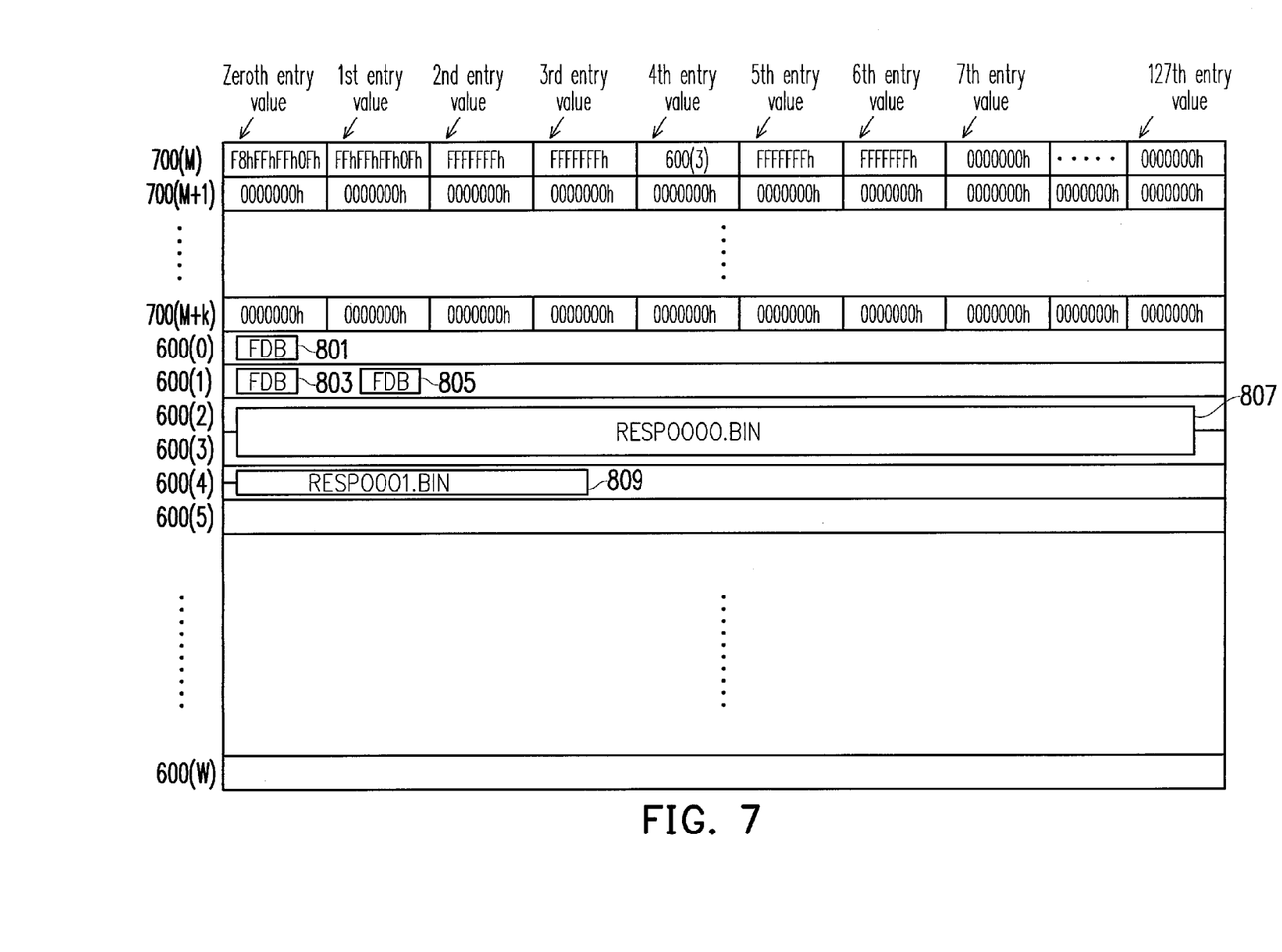
FIG. 7 is an example of creating a pre-set sub-directory and a pre-stored file according to the present exemplary embodiment.

FIG. 7 is a diagram of creating a pre-set sub-directory and a pre-stored file according to an exemplary embodiment.

Referring to FIG. 7, assuming that the application program 1120 creates a pre-set sub-directory called 'RESP' and pre-stores two files, 807 and 809, which are respectively named 'RESP0000.BIN' and 'RESP0001.BIN' in the memory storage apparatus 100, wherein two clusters are required for storing the file 807 named 'RESP0000.BIN' and one cluster is required for storing the file 809 named 'RESP0001.BIN'.

For the pre-set sub-directory, the operation system 1110 records the file description block 801 corresponding to the pre-set sub-directory named 'RESP' in the unused address of the cluster (for example, cluster 600(0)) allocated to the root directory area 906 and finds an empty cluster (for example, cluster 600(1)) to record the content of the pre-set sub-directory according to the file system in the memory storage apparatus 100, wherein the information of the cluster 600(1) is recorded in the file description block 801.

For the file 807, the operation system 1110 finds two empty clusters (for example, cluster 600(2) and cluster 600(3)) for storing the content of the file 807 according to the file system in the memory storage apparatus 100 and the size of the file 807. Moreover, the operation system 1110 records the file description block 803 corresponding to the file 807 in the cluster 600(1), modifies the entry value (the fourth entry value) corresponding to the cluster 600(2) to be the address of the cluster 600(3) and modifies the entry value (the fifth entry value) corresponding to the 600(3) to be "FFFFFFFh". Similarly, the operation system 1110 finds one empty clusters (for example, cluster 600(4)) for storing the content of the file 809 according to the file system in the memory storage apparatus 100 and the size of the file 809. Moreover, the operation system 1110 records the file description block 805 corresponding to the file 809 in the cluster 600(1) and modifies the entry value (the sixth entry value) corresponding to the cluster 600(4) to be "FFFFFFFh".

After completing the above steps, the host system 1000 identifies that a sub-directory named 'RESP' is stored in the memory storage apparatus 100 according to the file description block stored in the root directory area 906. Moreover, the host system 1000 identifies that the file 807 named 'RESP0000.BIN' and the file 809 named 'RESP0001.BIN' are stored in the memory storage apparatus 100 under a sub-directory named 'RESP' according to the file description block stored in the cluster 600(1) which is recorded in the file description of the sub-directory. For example, when the host system 1000 wants to read the file 807 named 'RESP0000.BIN', the operation system 1110 reads the data from the cluster 600(2) according to the file description block of the file 807, and then reads the data from the cluster 600(3) according to the entry value corresponding to the 600(2) in the file allocation table area 904 so as to complete the file reading.

Specially, in the present exemplary embodiment, when the host system 1000 performs the read operation on the file allocation table (FAT) and the root directory area 906, the memory controller 104 transmits the identification information of the pre-set sub-directory and the pre-stored file to the host system 1000. To be more specific, the host system 1000 receives the identification information such as the logical block address of the file description block 801 corresponding to the sub-directory named 'RESP', the cluster (for example, cluster 600(1)) recorded by the file description block 801, the logical block address of the file description block 803 corresponding to the file 807, the logical block address of the file description block 805 corresponding to the file 809, the logical block address of the content of the file 807 (for example, the cluster 600(2) and the cluster 600(3)), the logical block address of the content of the stored file 809 (for example, the cluster 600(4)), the file name of the file 807, the file name of the file 809 and so on.

Accordingly, while transmitting the command data unit to the smart card chip 108, the application program 1120 gives the write command for writing the communication file (i.e. file 807 or file 809). And, the memory controller 104 employs the identification information to identify that the received write command is used for accessing the communication file and transmit the data streams to the smart card chip 108.

Especially, in the present exemplary embodiment, the memory management circuit 202 of the memory controller 104 executes a plurality of write/delete protection mechanisms for protecting the pre-set sub-directory and the pre-stored file which are created for transmitting the command data unit from accidental deleting by the operation system 1110 or other application programs, adding other files therein or changing the name of the sub-directory. The following is the flow illustrating the write/delete protection mechanisms. However, it should be noted that, at least a portion of the write/delete protection mechanisms may be executed selectly in order to achieve the function of data protection.

(1) The mechanism for protecting the file description block of the sub-directory from deleting or amending In the present exemplary embodiment, while receiving the write command from the host system 1000, the memory management circuit 202 determines whether the logical block address indicated by the write command is the address storing the file description block 801. Specifically, as described above, the memory controller 104 transmits the identification information of the pre-set sub-directory to the application program 1120. Therefore, the memory management circuit 202 determines whether the logical block address indicated by the write command is the address storing the file description block 801 according to the identification information. When the logical block address indicated by the write command is the address storing the file description block 801, the memory management circuit 202 determines whether a portion of data streams corresponding to the write command is the same as the corresponding content recorded in the file description block of the sub-directory. For example, the memory management circuit 202 determines whether the 12 bytes content within the data streams corresponding to the write command is the same as the corresponding 12 bytes recorded in the file description block of the pre-set sub-directory (the corresponding 12 bytes include such as the name of the sub-directory, the read-only property, the hidden property, the system file property and the directory property, etc.). When the portion of the data streams corresponding to the write command is not the same as the corresponding content recorded in the file description block of the pre-set sub-directory, the memory management circuit 202 transmits the write failure signal to the host system 1000.

For example, after receiving the data streams corresponding to the write command, the memory management circuit 202 outputs a busy signal continuously in a predefined time period in order to cause a time out, and the host system 1000 then recognizes that the data writing is unsuccessful. To be more specific, after the host system 1000 gives the write command, when the memory management circuit 202 outputs the lower pulse continuously through a busy signal pin for a while (for example, 250 milliseconds), the host system 1000 then recognizes that the data writing is unsuccessful and gives the write command again (retry) or resets. Nevertheless, it should be understood that the present invention is not limited thereto. In another exemplary embodiment of the present invention, the memory management circuit 202 may also set an incorrect bit corresponding to the write command in a response message and transmit the response message back to the host system 1000 in order to inform the host system 1000 that the data writing is incomplete.

When the portion of the data streams corresponding to the write command is the same as the corresponding content recorded in the file description block of the pre-set sub-directory, the memory management circuit 202 completes the write operation according to the write command.

(2) The mechanism for protecting the file description block of the pre-stored file from removing or modifying In the present exemplary embodiment, while receiving the write command from the host system 1000, the memory management circuit 202 determines whether the logical block address indicated by the write command is the address storing the file description block (for example, file description block 803 or file description block 805) of the pre-stored file. Specifically, as described above, the memory controller 104 transmits the identification information of the pre-set sub-directory to the application program 1120. Therefore, the memory management circuit 202 determines whether the logical block address indicated by the write command is the address storing the file description block of the pre-stored file according to the identification information. When the logical block address indicated by the write command is the address storing the file description block of the pre-stored file, the memory management circuit 202 determines whether a portion of data streams corresponding to the write command is the same as the corresponding content recorded in the file description block of the pre-stored file. For example, the memory management circuit 202 determines whether the 12 bytes content within the data streams corresponding to the write command is the same as the corresponding content of 12 bytes recorded in the file description block of the pre-stored file (the corresponding content of 12 bytes include such as the name of the file, read-only property, hidden property, system file property and the file property, etc.). When the portion of the data streams corresponding to the write command is the same as the corresponding content recorded in the file description block of the pre-stored file, the memory management circuit 202 completes the write operation according to the write command. On the other hand, when the portion of the data streams corresponding to the write command is not the same as the corresponding content recorded in the file description block of the pre-stored file, the memory management circuit 202 transmits a write failure signal to the host system 1000.

Figure 8:
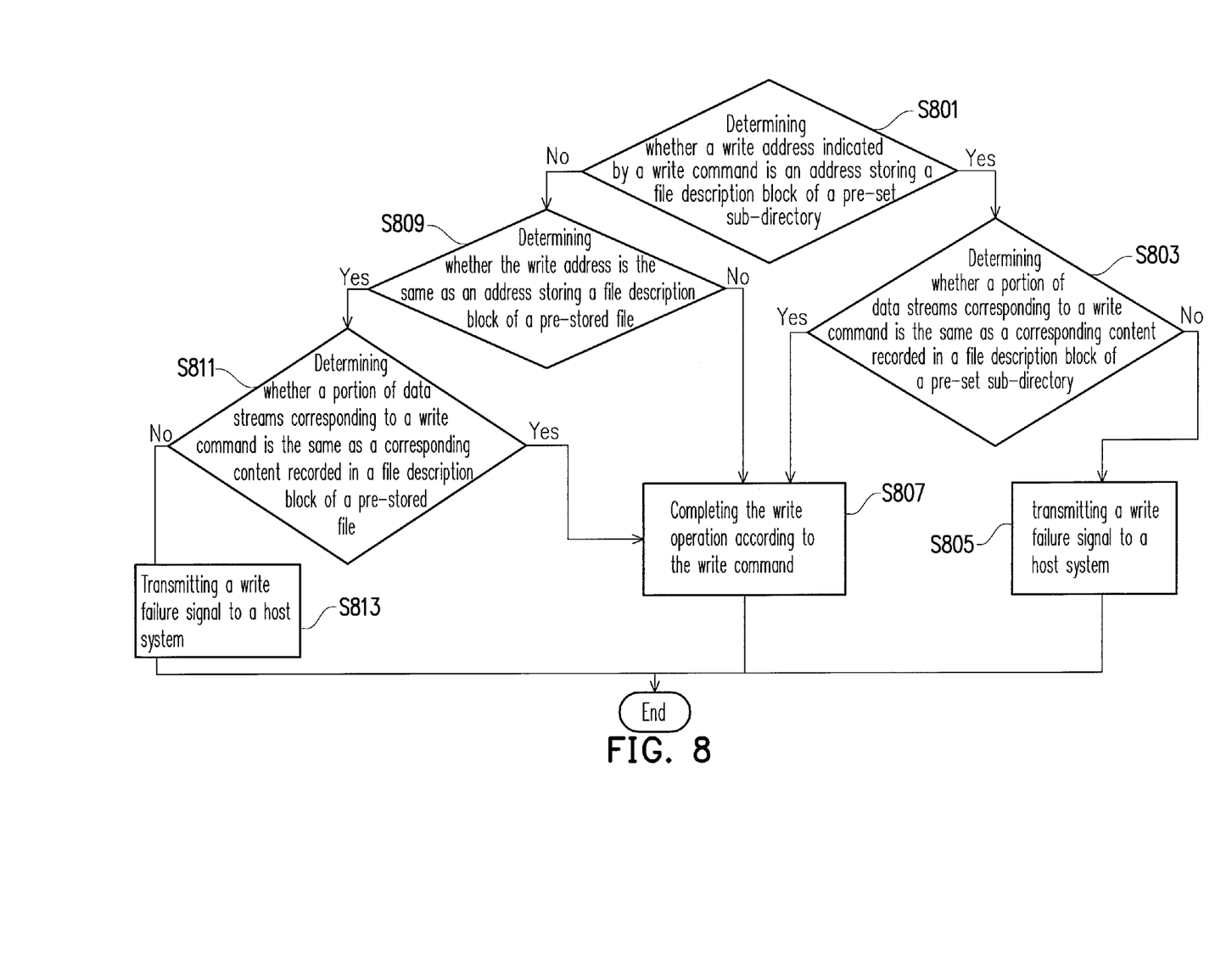
FIG. 8 is a flowchart illustrating a data protecting method according to an exemplary embodiment.

FIG. 8 is a flowchart illustrating a data protecting method according to an exemplary embodiment.

Referring to FIG. 8, in step S801, while receiving the write command, the memory management circuit 202 determines whether the write address indicated by the write command is the address storing in the file description block of the pre-set sub-directory.

When the write address is the address storing the file description block of the pre-set sub-directory, in step S803, the memory management circuit 202 determines whether a portion of data streams corresponding to the write command is the same as the corresponding content recorded in the file description block of the pre-set sub-directory.

When the portion of data streams corresponding to the write command is not the same as the corresponding content recorded in the file description block of the pre-set sub-directory, in step S805, the memory management circuit 202 transmits the write failure signal to the host system 1000. And, the process shown in the FIG. 8 is terminated after step S805. For example, the busy signal or the incorrect bit of the response signal may be applied by the memory management circuit 202 for transmitting the signal indicated the failure of the data writing. When the portion of the data streams corresponding to the write command is the same as the corresponding content recorded in the file description block of the pre-set sub-directory, in step S807, the memory management circuit 202 completes the write operation according to the write command. And, the process shown in the FIG. 8 is terminated after step S807.

When the write address is not the address storing the file description block of the pre-set sub-directory, in step S809, the memory management circuit 202 determines whether the write address is the same as the address storing the file description block of the pre-stored file.

When the write address is not the same as the address storing the file description block of the pre-stored file, step S807 will be executed.

When the write address is the address storing the file description block of the pre-stored file, in step S811, the memory management circuit 202 determines whether a portion of data streams corresponding to the write command is the same as the corresponding content recorded in the file description block of the pre-stored file. When the portion of the data streams corresponding to the write command is not the same as the corresponding content recorded in the file description block of the pre-stored file, in step S813, the memory management circuit 202 transmits the write failure signal to the host system 1000. And, the process shown in the FIG. 8 is terminated after step S813.

When the portion of the data streams corresponding to the write command is the same as the corresponding content recorded in the file description block of the pre-stored file, step S807 will be executed. It should be noted that, although in the above flow, the memory management circuit 202 determines whether the write address indicated by the write command is the address storing the file description block of the pre-set sub-directory before determining whether the write address is the address storing at least one file description block of at least one pre-stored file. However, in another flow graph, the memory management circuit 202 may directly determine whether the write address is the address storing the at least one file description block of the at least one pre-stored file.

In summary, the data protecting method, the memory controller and the memory storage apparatus provided by the exemplary embodiments of the present invention can effectively protect the pre-set sub-directory and the pre-stored file from accidental removing or modifying. The previously described exemplary embodiments of the present invention have the advantages aforementioned, wherein the advantages aforementioned not required in all versions of the invention.

Although the invention has been described with reference to the above embodiments, it will be apparent to one of ordinary skill in the art that modifications to the described embodiments may be made without departing from the spirit of the invention. Therefore, the protecting range of the invention falls in the appended claims.

What is claimed is:

1. A data protecting method, for protecting a sub-directory and at least one pre-stored file in the sub-directory stored into a rewritable non-volatile memory module, wherein the rewritable non-volatile memory module comprises a plurality of physical blocks and a plurality of logical block addresses are configured to map to a portion of the physical blocks, and the logical block addresses are formatted to be a partition having a file allocation table area, a root directory area and a file area, the data protecting method comprises:

receiving a write command from a host system, wherein the write command indicates a write address;

determining whether the write address is an address storing a file description block of the sub-directory;

determining whether a property data in data streams corresponding to the write command is the same as a corresponding content recorded in the file description block of the sub-directory when the write address is the address storing the file description block of the sub-directory; and transmitting a write failure signal to the host system when the property data in the data streams corresponding to the write command is not the same as the corresponding content recorded in the file description block of the sub-directory, wherein the property data comprises at least one of a name of the sub-directory, a read-only property of the sub-directory, a hidden property of the sub-directory, a system file property of the sub-directory and a directory property of the sub-directory.

2. The data protecting method according to claim 1, further comprises:

determining whether the write address is an address storing at least one file description bock of at least one pre-stored file when the write address is not the address storing the file description block of the sub-directory;

determining whether a portion of the data streams corresponding to the write command is the same as a corresponding content recorded in the at least one file description block of the at least one pre-stored file when the write address is the address storing the file description block of the pre-stored file; and transmitting the write failure signal to the host system when the portion of the data streams corresponding to the write command is not the same as the corresponding content recorded in the at least one file description block of the at least one pre-stored file.

3. The data protecting method according to claim 2, wherein the steps of transmitting the write failure signal to the host system comprises:

outputting a busy signal continuously within a predefined time period after receiving the data streams corresponding to the write command.

4. The data protecting method according to claim 2, wherein the steps of transmitting the write failure signal to the host system comprises:

setting an incorrect bit corresponding to the write command in a response message and transmitting the response message to the host system.

5. A data protecting method, for protecting at least one pre-stored file stored in a rewritable non-volatile memory module, wherein the rewritable non-volatile memory module comprises a plurality of physical blocks and a plurality of logical block addresses are configured to map to a portion of the physical blocks, and the logical block addresses are formatted to be a partition having a file allocation table area, a root directory area and a file area, the data protecting method comprises:

receiving a write command from a host system, wherein the write command indicates a write address;

determining whether the write address is an address storing at least one file description block of the at least one pre-stored file;

determining whether a property data in data streams corresponding to the write command is the same as a corresponding content recorded in the at least one file description block of the at least one pre-stored file when the write address is the address storing the at least one file description block of the pre-stored file; and transmitting a write failure signal to the host system when the property data in the data streams corresponding to the write command is not the same as the corresponding content recorded in the at least one file description block of the at least one pre-stored file, wherein the property data comprises at least one of a name of the sub-directory, a read-only property of the sub-directory, a hidden property of the sub-directory, a system file property of the sub-directory and a directory property of the sub-directory.

6. The data protecting method according to claim 5, wherein the steps of transmitting the write failure signal to the host system comprises:

outputting a busy signal continuously within a predefined time period after receiving the data streams corresponding to the write command.

7. The data protecting method according to claim 5, wherein the steps of transmitting the write failure signal to the host system comprises:

setting an incorrect bit corresponding to the write command in a response signal and transmitting the response signal to the host system.

8. A memory controller, for controlling a rewritable non-volatile memory module, wherein the rewritable non-volatile memory module includes a plurality of physical blocks, the memory controller comprises:

a host interface, coupled to a host system;

a memory interface, coupled to the rewritable non-volatile memory module; and a memory management circuit, coupled to the host interface and the memory interface, and configured to configure a plurality of logical block addresses for mapping to a portion of the physical blocks, wherein the logical block addresses are formatted to be a partition having a file allocation table area, a root directory area and a file area, the root directory area stores a file description block corresponding to a sub-directory, wherein the memory management circuit receives a write command from the host system, and the write command indicates a write address, wherein the memory management circuit determines whether the write address is an address storing the file description block of the sub-directory, wherein the memory management circuit determines whether a property data in data streams corresponding to the write command is the same as a corresponding content recorded in the file description block of the sub-directory when the write address is the address storing the file description block of the sub-directory, wherein the memory management circuit transmits a write failure signal to the host system when the property data in the data streams corresponding to the write command is not the same as the corresponding content recorded in the file description block of the sub-directory, wherein the property data comprises at least one of a name of the sub-directory, a read-only property of the sub-directory, a hidden property of the sub-directory, a system file property of the sub-directory and a directory property of the sub-directory.

9. The memory controller according to claim 8, wherein the memory management circuit determines whether the write address is an address storing the at least one file description bock of the at least one pre-stored file when the write address is not the address storing the file description block of the sub-directory, wherein the memory management circuit determines whether the property data in the data stream corresponding to the write command is the same as a corresponding content recorded in the at least one file description block of the at least one pre-stored file when the write address is the address storing the at least one file description block of the at least one pre-stored file, wherein the memory management circuit transmitting the write failure signal to the host system when the property data in the data streams corresponding to the write command is not the same as the corresponding content recorded in the at least one file description block of the at least one pre-stored file.

10. The memory controller according to claim 9, wherein the memory management circuit transmits the write failure signal to the host system by continuously outputting a busy signal in a predefined time period after receiving the data streams corresponding to the write command.

11. The memory controller according to claim 9, wherein the memory management circuit transmits the write failure signal to the host system by setting an incorrect bit corresponding to the write command in a response message and transmitting the response message to the host system.

12. A memory controller, configured for controlling a rewritable non-volatile memory module, wherein the rewritable non-volatile memory module includes a plurality of physical blocks, the memory controller comprises:
 a host interface, coupled to a host system;
 a memory interface, coupled to the rewritable non-volatile memory module; and
 a memory management circuit, coupled to the host interface and the memory interface, and configured to configure a plurality of logical block addresses for mapping to the portion of the physical blocks, wherein the logical block addresses are formatted to be a partition having a file allocation table area, a root directory area and a file area, the root directory area stores a file description block corresponding to a sub-directory, and a cluster recorded in the file description block of the sub-directory stores at least one file description block corresponding to at least one pre-stored file,
 wherein the memory management circuit receives a write command from the host system, and the write command indicates a write address,
 wherein the memory management circuit determines whether the write address is an address storing the at least one file description block of the at least one pre-stored file,
 wherein the memory management circuit determines whether a property data in data streams corresponding to the write command is the same as a corresponding content recorded in the at least one file description block of the at least one pre-stored file when the write address is the address storing the at least one file description block of the at least one pre-stored file,
 wherein the memory management circuit transmits a write failure signal to the host system when the property data in the data streams corresponding to the write command is not the same as the corresponding content recorded in the at least one file description block of the at least one pre-stored file,
 wherein the property data comprises at least one of a name of the sub-directory, a read-only property of the sub-directory, a hidden property of the sub-directory, a system file property of the sub-directory and a directory property of the sub-directory.

13. The memory controller according to claim 12, wherein the memory management circuit transmits the write failure signal to the host system by continuously outputting a busy signal in a predefined time period after receiving the data streams corresponding to the write command.

14. The memory controller according to claim 12, wherein the memory management circuit transmits the write failure signal to the host system by setting an incorrect bit corresponding to the write command in a response message and transmitting the response message to the host system.

15. A memory storage apparatus, comprising:
 a connector, coupled to a host system;
 a rewritable non-volatile memory module comprises a plurality of physical blocks; and
 a memory controller, coupled to the connector and the rewritable non-volatile memory module, and configured to configure a plurality of logical block addresses for mapping to a portion of the physical blocks, wherein the logical block addresses are formatted to be a partition having a file allocation table area, a root directory area and a file area, the root directory area stores a file description block corresponding to a sub-directory,
 wherein the memory controller receives a write command from the host system, and the write command indicates a write address,
 wherein the memory controller determines whether the write address is an address storing the file description block of the sub-directory,
 wherein the memory controller determines whether a property data in data streams corresponding to the write command is the same as a corresponding content recorded in the file description block of the sub-directory when the write address is the address storing the file description block of the sub-directory,
 wherein the memory controller transmits a write failure signal to the host system when the property data in the data streams corresponding to the write command is not the same as the corresponding content recorded in the file description block of the sub-directory,
 wherein the property data comprises at least one of a name of the sub-directory, a read-only property of the sub-directory, a hidden property of the sub-directory, a system file property of the sub-directory and a directory property of the sub-directory.

16. The memory storage apparatus according to claim 15, wherein the memory controller determines whether the write address is an address storing the at least one file description bock of at the least one pre-stored file when the write address is not the address storing the file description block of the sub-directory,
 wherein the memory controller determines whether the property data in the data streams corresponding to the write command is the same as a corresponding content recorded in the at least one file description block of the at least one pre-stored file when the write address is the address storing the at least one file description block of the at least one pre-stored file,
 wherein the memory management circuit transmits the write failure signal to the host system when the property data in the data streams corresponding to the write command is not the same as the corresponding content recorded in the at least one file description block of the at least one pre-stored file.

17. The memory storage apparatus according to claim 16, wherein the memory controller transmits the write failure signal to the host system by continuously outputting a busy signal in a predefined time period after receiving the data streams corresponding to the write command.

18. The memory storage apparatus according to claim 16, wherein the memory controller transmits the write failure signal to the host system by setting an incorrect bit corresponding to the write command in a response message and transmitting the response message to the host system.

19. A memory storage apparatus, comprising:
a connector, coupled to a host system;
a rewritable non-volatile memory module comprises a plurality of physical blocks; and
a memory controller, coupled to the connector and the rewritable non-volatile memory module, and configured to configure a plurality of logical block addresses for mapping to a portion of the physical blocks, wherein the logical block addresses are formatted to be a partition having a file allocation table area, a root directory area and a file area, the root directory area stores a file description block corresponding to a sub-directory, and a cluster recorded in the file description block of the sub-directory stores at least one file description block corresponding to at least one pre-stored file,
wherein the memory controller receives a write command from the host system, and the write command indicates a write address,
wherein the memory controller determines whether the write address is an address storing the at least one file description block of the at least one pre-stored file,
wherein the memory controller determines whether a property data in data streams corresponding to the write command is the same as a corresponding content recorded in the at least one file description block of the at least one pre-stored file when the write address is the address storing the at least one file description block of the at least one pre-stored file,
wherein the memory controller transmits the write failure signal to the host system when the property data in the data streams corresponding to the write command is not the same as the corresponding content recorded in the at least one file description block of the at least one pre-stored file,
wherein the property data comprises at least one of a name of the sub-directory, a read-only property of the sub-directory, a hidden property of the sub-directory, a system file property of the sub-directory and a directory property of the sub-directory.

20. The memory storage apparatus according to claim 19, wherein the memory controller transmits the write failure signal to the host system by continuously outputting a busy signal in a predefined time period after receiving the data streams corresponding to the write command.

21. The memory storage apparatus according to claim 19, wherein the memory controller transmits the write failure signal to the host system by setting an incorrect bit corresponding to the write command in a response message and transmitting the response message to the host system.

* * * * *